United States Patent
Nuuja

(10) Patent No.: US 9,706,076 B2
(45) Date of Patent: Jul. 11, 2017

(54) 3D PRINTER STEGANOGRAPHY

(71) Applicant: Xerox Corporation, Norwalk, CT (US)

(72) Inventor: Robert Eero Nuuja, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/712,159

(22) Filed: May 14, 2015

(65) Prior Publication Data

US 2016/0337549 A1   Nov. 17, 2016

(51) Int. Cl.
| | |
|---|---|
| *H04N 1/409* | (2006.01) |
| *H04N 1/32* | (2006.01) |
| *H04N 1/44* | (2006.01) |
| *G06F 3/12* | (2006.01) |
| *B29C 67/00* | (2017.01) |
| *G06F 21/60* | (2013.01) |

(52) U.S. Cl.
CPC ..... *H04N 1/32229* (2013.01); *B29C 67/0051* (2013.01); *G06F 3/1222* (2013.01); *G06F 3/1238* (2013.01); *G06F 3/1243* (2013.01); *G06F 21/608* (2013.01); *H04N 1/32293* (2013.01); *H04N 1/32325* (2013.01); *H04N 1/444* (2013.01)

(58) Field of Classification Search
None
See application file for complete search history.

(56) References Cited

U.S. PATENT DOCUMENTS

| | | | |
|---|---|---|---|
| 6,201,881 B1 | 3/2001 | Masuda et al. | |
| 2012/0140251 A1* | 6/2012 | Grodsky | G06F 3/1206 358/1.9 |
| 2014/0293297 A1* | 10/2014 | Nagahara | G06K 15/024 358/1.6 |
| 2015/0235069 A1* | 8/2015 | Kumar | G06K 7/1426 235/462.09 |
| 2015/0287247 A1* | 10/2015 | Willis | G06T 19/20 345/419 |
| 2016/0026418 A1* | 1/2016 | Bastaldo-Tsampalis | G06F 3/1243 358/1.15 |

\* cited by examiner

*Primary Examiner* — Helen Q Zong
(74) *Attorney, Agent, or Firm* — Fay Sharpe LLP

(57) ABSTRACT

When printing 3D objects a print file to be executed by a 3D printer to generate a 3D object is analyzed to identify candidate regions for insertion of printer ID information that identifies the printer printing the 3D object. Code describing the printer identification information is inserted into the print file at appropriate locations to cause the 3D printer to print one or more structures representing the printer identification information in one or more identified candidate regions. The printer identification information is printed by omitting or replacing one or more voxels in the printed object. Structures representing the printer identification information may include, e.g., barcodes, glyphs, alphanumeric sequences, etc. The printer identification information may include, e.g., a printer serial number and/or time stamp, manufacturer copyright and/or trademark information, etc.

16 Claims, 3 Drawing Sheets

3D PRINTER STEGANOGRAPHY

TECHNICAL FIELD

The presently disclosed embodiments are directed toward authenticating 3D-printed objects. However, it is to be appreciated that the present exemplary embodiments are also amenable to other like applications.

BACKGROUND

Conventional scanners can make digital copies of existing three dimensional objects. These digital copies can be manufactured by 3D printers. For example, a 3D scanner can be used to create 3-dimensional models of a person's mouth and teeth. These models can be used by 3D printers to create teeth, bridges, and other dental prosthetics that fit precisely.

One disadvantage of low-cost 3D print manufacturing is that it greatly increases the potential for counterfeiting. Anyone with a 3D printer and a 3-D scanner will be able to reproduce another person's design undetectably and without permission, in some cases in violation of the law.

Various methods are used today to prevent counterfeiting and provide authentication. For instance, seals, watermarks and holograms have been proposed to provide reasonable protection against counterfeiters. Surface bar codes and (quick response) QR codes are used to identify and authenticate objects. Transparent objects, such as glass bottles, may have symbols engraved on or embedded in them. The problem with these methods is that they are obvious and therefore can also be copied, along with the object they intend to protect.

As 3D printing and scanning technologies become pervasive, large numbers of ordinary people may copy and manufacture other people's designs. Difficulties associated with counterfeit detection have already detrimentally impacted the music industry as ordinary people continue to copy and share digital files on a massive scale without compensating the artists or publishers. With the proliferation of 3D printers and scanners, similar widespread counterfeiting can be expected with respect to objects that can be generated using such technology.

There is a need in the art for systems and methods that facilitate identifying and/or authenticating a 3D printing source, while overcoming the aforementioned deficiencies.

BRIEF DESCRIPTION

In one aspect, a method for identifying a printing source of a 3D printed object comprises analyzing a 3D object print file for printing a 3D printed object to identify one or more candidate regions within a 3D printed object for insertion of printer identification information, and inserting computer-executable code into the 3D object print file for printing the printer identification information in the one or more candidate regions. The method further comprises printing the 3D object with the printer identification information embedded in the one or more candidate regions.

In another aspect, a method of embedding printer identification information in a multi-material 3D printed object comprises analyzing a 3D object print file for printing a 3D printed object, identifying at least first and second materials for printing the 3D object, and identifying one or more candidate regions within a 3D printed object for insertion of printer identification information. The method further comprises inserting computer-executable code into the 3D object print file for printing the printer identification information in the one or more candidate regions, and printing the 3D object with the printer identification information embedded in the one or more candidate regions. The second material is deposited to embed the printer identification information in a candidate region within a layer of the first material, and the first material is deposited to embed the printer identification information in a candidate region within a layer of the second material.

In yet another aspect, a system that facilitates identifying a printing source of a 3D printed object comprises a processor arranged to analyze a 3D object print file for printing a 3D printed object, identify one or more candidate regions within a 3D printed object for insertion of printer identification information, and insert computer-executable code into the 3D object print file for printing the printer identification information in the one or more candidate regions. The system further comprises a 3D printer that executes the print file with the inserted computer-executable code in order to print the 3D object with the printer identification information embedded in the one or more candidate regions.

DETAILED DESCRIPTION

Figure 1:
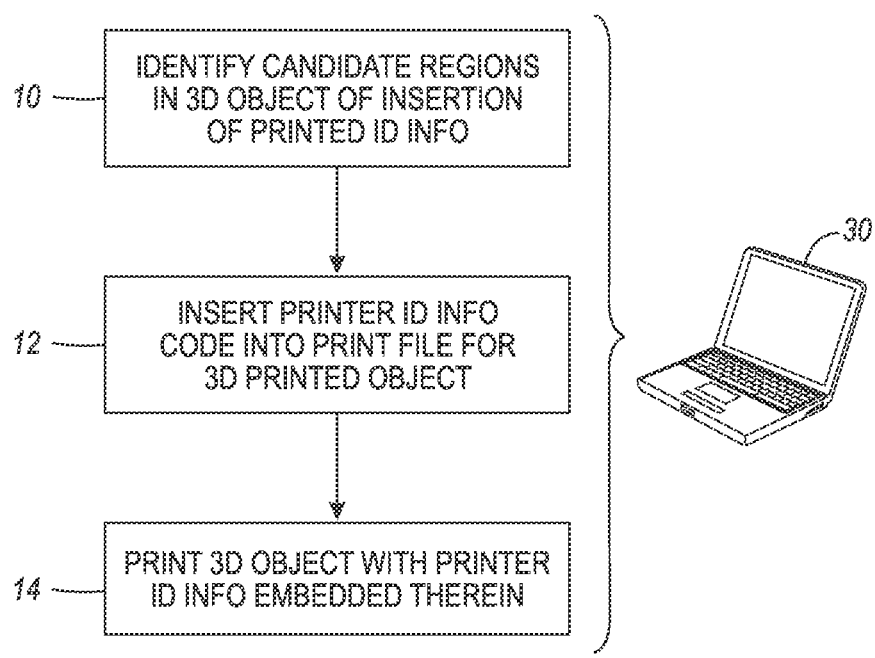
FIG. 1 illustrates a method for encoding printer identification information in three dimensions using 3D printers, in accordance with one or more features described herein.

FIG. 1 illustrates a method for encoding printer identification information in three dimensions using 3D printers, in accordance with one or more features described herein. For instance, when using 3D printers which only use a single material, steganographic tracking dots are created by omission of certain voxels in a three dimensional pattern. When using 3D printers which use more than one material, voxels or tracking dots are created in whichever material has the least utility in any particular area so that printed object integrity is not compromised. The three dimensional steganographic patterns can be interlaced throughout the entire volume of the printed object. In another embodiment, the patterns are limited to certain areas of the object, such as its center or its surface. These three dimensional steganographic patterns are created such that the encrypted patterns can be decoded via physical or tomographic analysis of the final printed object.

At 10, a 3D object print file for printing a 3D printed object is analyzed to identify one or more suitable candidate regions within the 3D printed object for insertion of printer identification information. At 12, computer-executable code descriptive of the printer identification information to be embedded is inserted into the 3D object print file for printing the printer identification information in the one or more candidate regions. At 14, the 3D object is printed with the printer identification information embedded in the one or a plurality of candidate regions within the 3D object.

In one embodiment, the printer identification information is embedded into the 3D printed object by omitting one or more voxels within the 3D printed object to form one or more structures within the 3D printed object. The one or more candidate regions can be identified as being regions that do not affect the structural integrity of the 3D printed object so that the printing of the printer identification information does not degrade object performance. For instance, if the 3D object has a load-bearing portion, then candidate regions for insertion of the printer identification information can be identified in regions other than the load-bearing portion so that the voids created by voxel omission do not degrade the strength or integrity of the load bearing portion. It will be appreciated that the foregoing example is provided for illustrative purposes only, and that the herein-described embodiments are not limited thereto, as will be appreciated by those of skill in the art.

According to an example, the printer identification information can be embedded as a 3D barcode within the 3D printed object. In another example, the printer identification information is embedded as a layered 2D barcode within the 3D printed object. In yet another example, the printer identification information is embedded as an alphanumeric sequence within the 3D printed object. Additionally or alternatively, the printer identification information is embedded as one or more glyphs (e.g., an elemental symbol within a set symbols) within the 3D printed object. It will be appreciated that the foregoing examples are provided for illustrative purposes only, and that the herein-described embodiments are not limited thereto, as will be appreciated by those of skill in the art.

The printer identification information can include a serial number for the 3D printed object and a time stamp. In another embodiment, the printer identification information includes at least one of trademark information and copyright information associated with the manufacturer of the 3D printed object.

It will be appreciated that the method of FIG. 1 can be implemented by a computer 30, which comprises a processor (such as the processor 102 of FIG. 3) that executes, and a memory (such as the memory 104 of FIG. 3) that stores, computer-executable instructions for providing the various functions, etc., described herein.

The computer 30 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 30 can include a processing unit (see, e.g., FIG. 3), a system memory (see, e.g., FIG. 3), and a system bus (not shown) that couples various system components including the system memory to the processing unit. The processing unit can be any of various commercially available processors. Multiple microprocessors and/or multi-core processor architectures also can be used as the processing unit.

The computer 30 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer through an input device (not shown) such as a keyboard, a pointing device, such as a mouse, stylus, voice input, or graphical tablet. The computer 30 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

Figure 2:
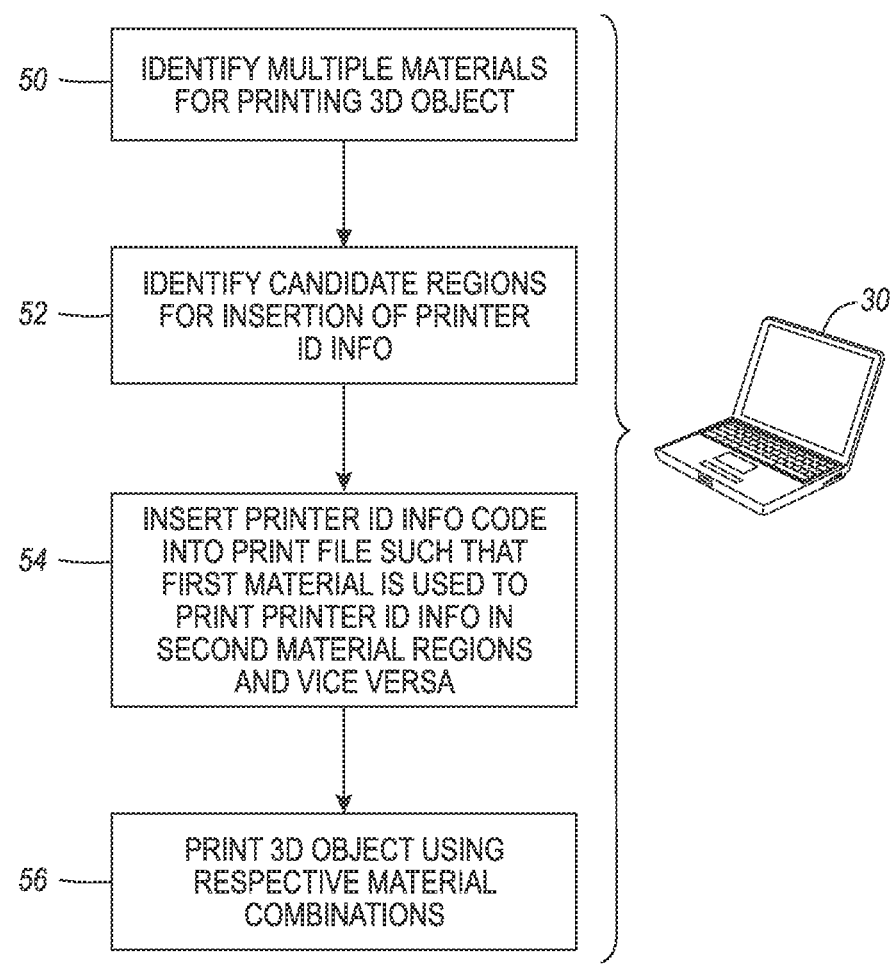
FIG. 2 illustrates a method of embedding printer identification information in a multi-material 3D printed object, in accordance with one or more aspects described herein.

FIG. 2 illustrates a method of embedding printer identification information in a multi-material 3D printed object, in accordance with one or more aspects described herein. At 50, a 3D object print file for printing a 3D printed object is analyzed, and at least two materials for printing the 3D object are identified. At 54, one or more candidate regions within the 3D printed object are identified for insertion of printer identification information. At 56, computer-executable code is inserted into the 3D object print file for printing the printer identification information in the one or more candidate regions. At 58, the 3D object is printed with the printer identification information embedded in the one or more candidate regions. According to one embodiment, a second material is deposited during printing with the first material to embed the printer identification information in a candidate region within a layer of the first material, and the first material is deposited during printing with the second material to embed the printer identification information in a candidate region within a layer of the second material.

In one embodiment, the one or more candidate regions can be identified as being regions that do not affect the structural integrity of the 3D printed object so that the printing of the printer identification information does not degrade object performance. For instance, if the 3D object has a camming surface portion, then candidate regions for insertion of the printer identification information can be identified in regions other than the camming surface portion so that the structural differences arising from employing a non-native material (e.g., the first material in the second material layer or vice versa) do not degrade the strength or integrity of the camming surface portion.

According to an example, the printer identification information can be embedded as a 3D barcode within the 3D printed object. In another example, the printer identification information is embedded as a layered 2D barcode within the 3D printed object. In yet another example, the printer identification information is embedded as an alphanumeric sequence within the 3D printed object. Additionally or alternatively, the printer identification information is embedded as one or more glyphs (e.g., an elemental symbol within a set symbols) within the 3D printed object. It will be appreciated that the foregoing examples are provided for illustrative purposes only, and that the herein-described embodiments are not limited thereto, as will be appreciated by those of skill in the art.

Figure 3:
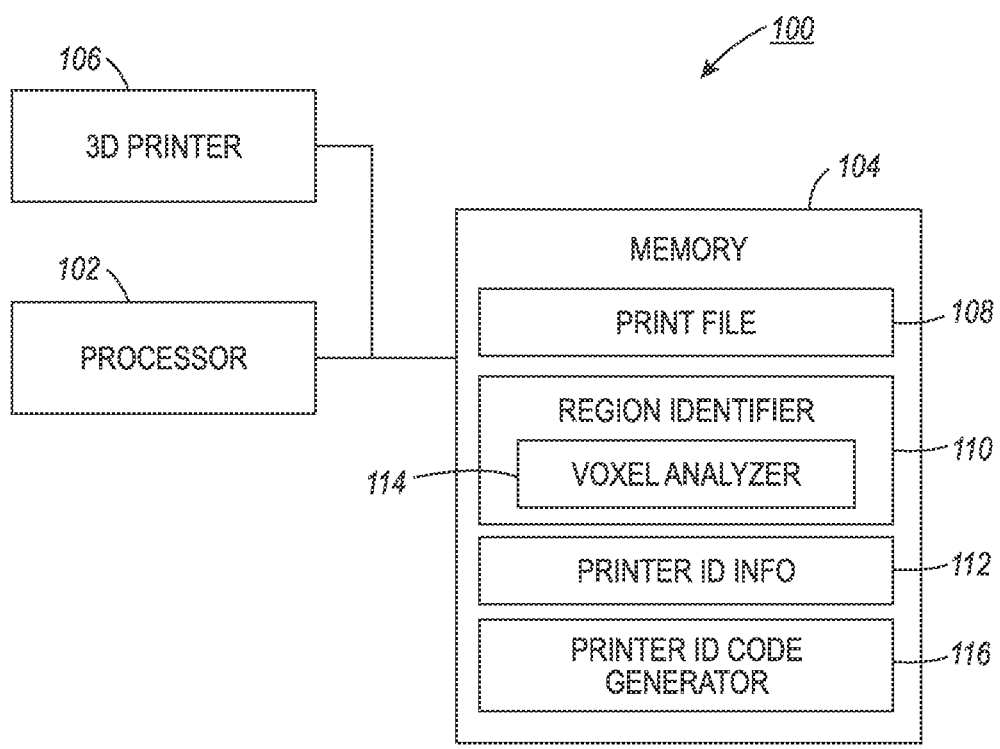
FIG. 3 illustrates a system that facilitates identifying a printing source of a 3D printed object, in accordance with one or more features described herein.

FIG. 3 illustrates a system 100 that facilitates identifying a printing source of a 3D printed object, in accordance with one or more features described herein. The system comprises a processor that executes computer-executable instructions stored on a computer-readable medium (memory) 104 for performing the various functions described herein. The processor and memory are coupled to a 3D printer 108 that executes a print file 108 to generate a 3D printed object. For instance, the processor 102 analyzes the 3D object print file 108 and executes a candidate region identifier module 110 that identifies one or more candidate regions within the 3D printed object for insertion of printer identification information 112. The candidate region identifier module comprises a voxel analyzer 114 that identifies voxels or voxel clusters that are candidates for printer identification information insertion. Such candidate regions, in one embodiment, are regions that do not impact the function or integrity of the printed 3D object if omitted or replaced by a different D printing material.

The processor 102 also executes a printer ID code generator module 116 that generates insertable computer-executable code for printing the printer identification information within the 3D printed object. The processor inserts the computer-executable code into the 3D object print file for printing the printer identification information in the one or more candidate regions. When executed by the 3D printer, the inserted code causes the 3D printer to generate one or more structures representing the printer identification information in a readable manner, such that the printer identification information can be read (e.g., via inspection, x-ray, tomographic scan, ultrasound, or the like) to identify the 3D printed object as having been printed by the particular 3D printer in which it was in fact printed.

It will be understood that the processor 102 executes, and the memory 104 stores, computer executable instructions for carrying out the various functions and/or methods described herein. The memory 104 may be a computer-readable medium on which a control program is stored, such as a disk, hard drive, or the like. Common forms of computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor 102 can read and execute. In this context, the described systems may be implemented on or as one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphics processing unit (GPU), or PAL, or the like.

In one embodiment, the identification information is embedded by omitting one or more voxels within the 3D printed object to form one or more structures within the 3D printed object. In another embodiment, the omitted voxels are replaced by voxels of a different material than the original voxels. In another embodiment, the one or more candidate regions are identified as being regions that do not affect the structural integrity of the 3D printed object so that the printing of the printer identification information does not degrade object performance. The printer identification information can be printed in one or a plurality of candidate regions throughout the 3D printed object.

According to one example, the printer identification information is printed as a 3D barcode within the 3D printed object. In another example, the printer identification information is printed as a layered 2D barcode within the 3D printed object. In yet another example, the printer identification information is printed as an alphanumeric sequence within the 3D printed object. Additionally or alternatively, the printer identification information is printed as one or more glyphs within the 3D printed object. The printer identification information can include a serial number for the 3D printed object and a time stamp. In another embodiment, the printer identification information includes at least one of trademark information and copyright information associated with the manufacturer of the 3D printed object. It will be appreciated that the foregoing examples are provided for illustrative purposes only, and that the herein-described embodiments are not limited thereto, as will be appreciated by those of skill in the art.

The exemplary embodiments have been described. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A method for identifying a printing source of a 3D printed object, comprising:
 analyzing a 3D object print file for printing a 3D printed object to identify one or more candidate regions within a 3D printed object for insertion of printer identification information, wherein the one or more candidate regions are identified as being regions that do not affect the structural integrity of the 3D printed object so that the printing of the printer identification information does not degrade object performance;
 inserting computer-executable code into the 3D object print file for printing the printer identification information in the one or more candidate regions; and
 printing the 3D object with the printer identification information embedded in the one or more candidate regions;
 wherein the printer identification information is embedded by omitting one or more voxels within the 3D printed object to form one or more structures each comprising one or more voids created by voxel omission within the 3D printed object.

2. The method according to claim 1, further comprising printing the printer identification information in a plurality of candidate regions throughout the 3D printed object.

3. The method according to claim 1, further comprising printing the printer identification information as a 3D barcode within the 3D printed object.

4. The method according to claim 1, further comprising printing the printer identification information as a layered 2D barcode within the 3D printed object.

5. The method according to claim 1, further comprising printing the printer identification information as an alphanumeric sequence within the 3D printed object.

6. The method according to claim 1, further comprising printing the printer identification information as one or more glyphs within the 3D printed object.

7. The method according to claim 1, wherein the printer identification information includes a serial number for the 3D printed object and a time stamp.

8. The method according to claim 1, wherein the printer identification information includes at least one of trademark information and copyright information associated with the manufacturer of the 3D printed object.

9. A system that facilitates identifying a printing source of a 3D printed object, comprising:
a processor arranged to:
analyze a 3D object print file for printing a 3D printed object;
identify one or more candidate regions within a 3D printed object for insertion of printer identification information, wherein the one or more candidate regions are identified as being regions that do not affect the structural integrity of the 3D printed object so that the printing of the printer identification information does not degrade object performance; and
insert computer-executable code into the 3D object print file for printing the printer identification information in the one or more candidate regions; and
a 3D printer that executes the print file with the inserted computer-executable code in order to print the 3D object with the printer identification information embedded in the one or more candidate regions;
wherein the identification information is embedded by omitting one or more voxels within the 3D printed object to form one or more structures each comprising one or more voids created by voxel omission within the 3D printed object.

10. The system according to claim 9, wherein the printer identification is printed in a plurality of candidate regions throughout the 3D printed object.

11. The system according to claim 9, wherein the printer identification information is printed as a 3D barcode within the 3D printed object.

12. The system according to claim 9, wherein the printer identification information is printed as a layered 2D barcode within the 3D printed object.

13. The system according to claim 9, wherein the printer identification information is printed as an alphanumeric sequence within the 3D printed object.

14. The system according to claim 9, wherein the printer identification information is printed as one or more glyphs within the 3D printed object.

15. The system according to claim 9, wherein the printer identification information includes a serial number for the 3D printed object and a time stamp.

16. The system according to claim 9, wherein the printer identification information includes at least one of trademark information and copyright information associated with the manufacturer of the 3D printed object.

* * * * *